(12) United States Patent
Li (10) Patent No.: US 12,550,029 B2
(45) Date of Patent: Feb. 10, 2026

(54) METHOD FOR DETERMINING TARGET CELL, TERMINAL DEVICE, AND STORAGE MEDIUM

(71) Applicant: GUANGDONG OPPO MOBILE TELECOMMUNICATIONS CORP., LTD., Guangdong (CN)

(72) Inventor: Ziyang Li, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 391 days.

(21) Appl. No.: 18/324,819

(22) Filed: May 26, 2023

(65) Prior Publication Data
US 2023/0300704 A1    Sep. 21, 2023

Related U.S. Application Data

(63) Continuation of application No. PCT/CN2021/125959, filed on Oct. 25, 2021.

(30) Foreign Application Priority Data

Dec. 11, 2020    (CN) .......................... 202011460668.6

(51) Int. Cl.
*H04W 36/30* (2009.01)
*H04W 36/00* (2009.01)
*H04W 36/08* (2009.01)

(52) U.S. Cl.
CPC ..... *H04W 36/30* (2013.01); *H04W 36/00835* (2018.08); *H04W 36/0094* (2013.01); *H04W 36/08* (2013.01)

(58) Field of Classification Search
CPC ........... H04W 36/30; H04W 36/00835; H04W 36/0094; H04W 36/08
See application file for complete search history.

(56) References Cited

U.S. PATENT DOCUMENTS

2011/0151919 A1    6/2011  Shin
2012/0307665 A1    12/2012 Cardineau et al.
(Continued)

FOREIGN PATENT DOCUMENTS

CN    105282807 A    1/2016
CN    105072643 B    2/2019
(Continued)

OTHER PUBLICATIONS

Chinese First Office Action, Chinese Application No. 202011460668.6, mailed Dec. 2, 2022 (12 pages).
(Continued)

*Primary Examiner* — Ayman A Abaza
*Assistant Examiner* — Benjamin T. Ranew
(74) *Attorney, Agent, or Firm* — Ladas & Parry LLP (57) ABSTRACT

The present disclosure provides a method for determining a target cell, a terminal device and a non-transitory computer readable storage medium. The method is performed by the terminal device, and includes: measuring at least one neighboring cell, in response to a signal-to-interference-plus-noise ratio (SINR) of a serving cell being less than a first threshold value; and determining a target cell based on a result of measuring the at least one neighboring cell.

17 Claims, 4 Drawing Sheets

(56) References Cited

U.S. PATENT DOCUMENTS

| | | | |
|---|---|---|---|
| 2016/0360462 A1 | | 12/2016 | Chockalingam et al. |
| 2018/0035345 A1* | | 2/2018 | Chockalingam .. H04W 36/0058 |
| 2018/0288666 A1* | | 10/2018 | Fujishiro ............... H04W 48/20 |
| 2021/0258841 A1 | | 8/2021 | Cai et al. |

FOREIGN PATENT DOCUMENTS

| | | | | | |
|---|---|---|---|---|---|
| CN | 110611922 A | | 12/2019 | | |
| CN | 110831085 A | | 2/2020 | | |
| CN | 110856205 A | | 2/2020 | | |
| CN | 111314939 A | * | 6/2020 | ............ | H04W 24/02 |
| CN | 111866973 A | | 10/2020 | | |
| CN | 111970736 A | | 11/2020 | | |
| CN | 112601263 A | | 4/2021 | | |
| JP | 2011515941 A | | 5/2011 | | |

OTHER PUBLICATIONS

International Search Report, International Application No. PCT/CN2021/125959 , mailed Jan. 5, 2022 (20 pages).
European Search Report, European Patent Application No. 21902242.3, mailed Apr. 26, 2024 (10 pages).
Chinese Rejection decision, Application No. 202011460668.6, mailed Feb. 7, 2024 (11 pages).
Chinese second Office Action, Chinese Application No. 202011460668.6, mailed Jun. 13, 2023 (12 pages).
Chinese Third Office Action, Chinese Application No. 202011460668.6, mailed Sep. 21, 2023 (12 pages).
Chinese Fourth Office Action, Chinese Application No. 202011460668.6, mailed Dec. 12, 2023 (12 pages).

* cited by examiner

METHOD FOR DETERMINING TARGET CELL, TERMINAL DEVICE, AND STORAGE MEDIUM

CROSS-REFERENCE TO RELATED APPLICATIONS

The present disclosure is a continuation-application of International (PCT) Patent Application No. PCT/CN2021/125959 filed Oct. 25, 2021, which claims priority of Chinese Patent Application No. 202011460668.6, filed on Dec. 11, 2020, the contents of which are hereby incorporated by reference.

TECHNICAL FIELD

The present disclosure relates to the field of communication technologies, and in particular, to a method for determining a target cell, a terminal device and a non-transitory computer readable storage medium.

BACKGROUND

When a reference-signal receiving-power (RSRP) or a reference-signal receiving-quality (RSRQ) of a serving cell where a terminal device resides is strong, the terminal device will reside in the serving cell and will not initiate neighboring cell measurement, and thus not switching to a neighboring cell. However, when the RSRP or the RSRQ of the serving cell is strong, other factors may affect the performance of the terminal device in transmitting and receiving data. Therefore, how to improve the performance of the terminal device in transmitting and receiving data through the neighboring cell measurement is a technical problem that needs to be solved.

SUMMARY

A method for determining a target cell, a terminal device and a non-transitory computer readable storage medium are provided by some embodiments of the present disclosure.

The technical solution of embodiments of the present disclosure is implemented as the follows:

In a first aspect, some embodiments of the present disclosure a method for determining a target cell, which is performed by a terminal device and includes: measuring at least one neighboring cell, in response to a signal-to-interference-plus-noise ratio (SINR) of a serving cell being less than a first threshold value; and determining a target cell based on a result of measuring the at least one neighboring cell.

In a second aspect, some embodiments of the present disclosure provide a terminal device, and the terminal device causes a processor to perform: measuring at least one neighboring cell in response to a signal-to-interference-plus-noise ratio (SINR) of a serving cell being less than a first threshold value; and determining a target cell based on a result of measuring the at least one neighboring cell.

In a third aspect, some embodiments of the present disclosure provide a non-transitory computer readable storage medium which stores an executable program. When the executable program is executed by a processor, the processor is caused to perform: measuring at least one neighboring cell, in response to a signal-to-interference-plus-noise ratio (SINR) of a serving cell being less than a first threshold value; and determining a target cell based on a result of measuring the at least one neighboring cell.

DETAILED DESCRIPTION OF THE PREFERRED EMBODIMENTS

The present disclosure will be described more fully below with reference to the relevant drawings and embodiments. It should be understood that the described embodiments are intended to illustrate the present disclosure, and do not contribute to any improper limitations of the present disclosure.

The terms and phrases involved in the embodiments of the present disclosure are explained before the present disclosure is further described in detail. The terms and phrases involved in the embodiments of the present disclosure are applicable to the following explanations.

1) S Criterion

The S criterion is usually used by a terminal device to determine whether a cell is suitable for residence. For details, TS36.304 may be referenced, which includes the followings.

When a cell selection receiving power value (Srxlev) is greater than 0 decibels (dB) and a cell selection quality value (Squal) is greater than 0 dBs, the cell complies with the S criterion.

$$Srxlev = Qrxlevmeas - (Qrxlevmin + Qrxlevminoffset) - Pcompensation.$$

$$Squal = Qqaualmeas - (Qqualmin + Qqualminoffset).$$

Qrxlevmeas is a downlink measured power value of the cell, and Qrxlevmin is a minimum receiving power value of the cell (in dBm). Qrxlevminoffset is an offset value relative to Qrxlevmin, and is configured to calculate the S criterion when the terminal device resides in visited public land mobile network (VPLMN) and periodically searches for higher priority PLMN. Pcompensation is a maximum value between (PEMX-PPowerClass, 0) and 0, and PEMX is a maximum uplink transmission power defined by TS36.101. PPowerClass is a maximum radio frequency output power specified for dividing the power classes of the terminal device defined by TS36.101.

Qqaualmeas is a measured quality value of the cell; Qqualmin is a minimum required mass value of the cell (in dBm); Qqualminoffset is an offset value relative to Qqualmin, and is configured to calculate the S criterion when the terminal device resides in the VPLMN and periodically searches for higher priority PLMN.

2) Cell Reselection Measurement Criterion

For cell reselection, when evaluating Srxlev and Square of a non-serving cell, a UE should use parameters provided by a serving cell. Specifically, the cell reselection measurement criterion includes followings.

If the serving cell fulfils Srxlev>SintraSerachP and Square>SIntraSearchQ, the terminal device may choose not to perform intra-frequency measurement.

Otherwise, the terminal device shall perform the intra-frequency measurement.

For evolved universal mobile telecommunications system terrestrial radio access network (E-UTRAN) inter-frequency and inter-RAT frequency specified in communication, the measurement criterion includes: for, an E-UTRAN inter-frequency or inter-RAT frequency with a reselection priority higher than a reselection priority of the current E-UTRA frequency, the terminal device shall perform measurement E-UTRAN inter-frequency or inter-RAT frequency with higher priority according to TS36.133.

For E-UTRAN inter-frequency with a reselection priority equal to or lower than the current E-UTRAN frequency, and for an inter-RAT frequency with a reselection priority lower than the current E-UTRAN frequency, if the serving cell fulfils Srxlev>SnonIntraSerachP and Square>SnonIntraSearchQ, the terminal device may choose not to perform E-UTRAN inter-frequency or inter-RAT cell measurement with the equal or lower priority; otherwise, the terminal device should perform E-UTRAN inter-frequencies or inter-RAT cell measurement with the equal or lower priority according to TS36.133.

3) R Criterion

In cell sequencing criterion, Rs represents the serving cell and Rn represents a neighboring cell, which defined as below:

$$Rs=Qmeas,s+QHyst$$

$$Rn=Qmeas,n+Qoffset$$

Qmeas,s is a signal-receiving-quality measurement value of the serving cell; QHyst is a cell reselection delay; Qmeas,n is a signal-receiving-quality measurement value of the neighboring cell; For a intra-frequency cell; if Qoffset,n is valid, Qoffset is Qoffset,n, otherwise Qoffset is 0; For an inter-frequency cell, if Qoffset,n is valid, Qoffset=Qoffset, n+Qoffsetfrequency, Otherwise, Qoffset=Qoffsetfrequency.

The sequencing of the cells follows the R criterion, Qmeas,s, and Qmeas,n are obtained by using the average value of RSCP, thereby calculating a R value. If a cell is determined to be the best after sequencing, the terminal device should be re-selected to the cell.

Figure 1:
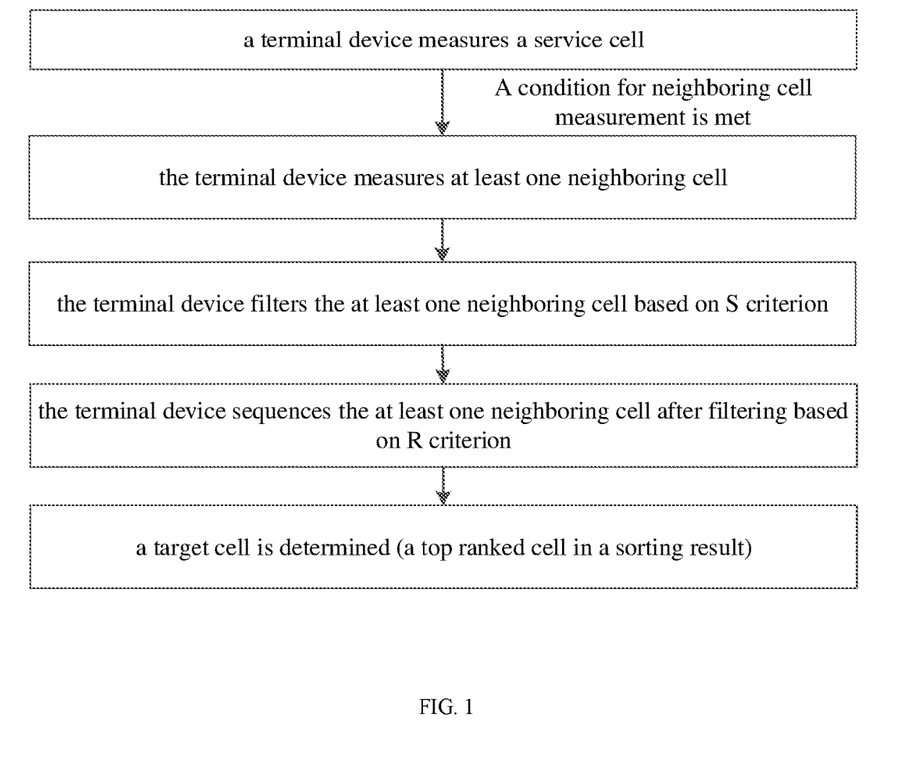
FIG. 1 is a schematic flowchart of cell reselection in related arts.

The following description will introduce the specific steps of cell reselection in related arts. FIG. 1 shows a schematic flowchart of cell reselection in related arts.

As shown in FIG. 1, the conditions for the terminal device to initiate neighboring cell measurement may be divided into two situations: one is intra-frequency measurement, and the other is inter-frequency measurement, but the principles of the intra-frequency measurement and the inter-frequency measurement are the same. The difference is only that threshold values of the intra-frequency measurement and the inter-frequency measurement are different, and the threshold value is obtained through a system information block (SIB) message of the cell. Essentially, the serving cell will carry the threshold values of the intra-frequency measurement and the inter-frequency measurement in cell broadcast, and when a reference-signal receiving-power (RSRP) of the serving cell measured by the terminal device is lower than the threshold value after the RSRP is processed according to the S criterion, the terminal device will correspondingly start the intra-frequency measurement or inter-frequency measurement respectively.

When the RSRP of a cell resided by the terminal device is strong, but the interference and noise are high, that is, when the RSRP is strong, but a signal-to-interference-plus-noise ratio (SINR) is poor, since the cell reselection solution in related arts only considers the RSRP or the RSRP and a reference-signal receiving-quality (RSRQ), without considering the SINR, the terminal device will still reside in the current serving cell and will not initiate cell reselection. Under this circumstance, the bit error rate of transmitting and receiving data will be very high due to the influence of noise and interference; when the SINR drops to a certain extent, resulting in the terminal device being unable to access the internet normally, which is also a common reason why a phone signal is full but there is no network.

Based on the problems in a cell handover method, a method for determining a target cell is provided by the present disclosure to solve technical difficulties and shortcomings that cannot be solved in related arts.

In some embodiments, a method for determining a target cell is provided. The method is performed by a terminal device, and includes: measuring at least one neighboring cell, in response to a signal-to-interference-plus-noise ratio (SINR) of a serving cell being less than a first threshold value; and determining a target cell based on a result of measuring the at least one neighboring cell.

Alternatively, the method further includes: adding the serving cell to a blacklist, and setting a reference signal received power (RSRP) value of the serving cell as a first value during running of a first timer corresponding to the serving cell. The blacklist is a list of neighboring cells with a SINR less than the first threshold value.

Alternatively, the determining a target cell based on a result of measuring the at least one neighboring cell, includes: filtering the at least one neighboring cell based on S criterion, and obtaining a first cell list.

Alternatively, the method further includes: removing a first cell from the first cell list in response to the first cell in the first cell list being on the blacklist.

Alternatively, the determining a target cell based on a result of measuring the at least one neighboring cell, includes: sequencing cells in the first cell list based on R criterion, and determine a top ranked cell as the target cell.

Alternatively, the adding the serving cell to a blacklist, includes: adding the serving cell to the blacklist and starting the first timer. The method further includes removing the serving cell from the blacklist after the running of the first timer.

Alternatively, the first value is greater than or equal to −200 dBs.

Alternatively, at least one of the conditions where a RSRP of the serving cell is greater than a second threshold value and a RSRQ of the serving cell is greater than the third threshold value is met.

Alternatively, the second threshold value is a threshold value corresponding to the RSRP in a condition of initiating the neighboring cell; and the third threshold value is a threshold value corresponding to the RSRQ in a conditions of initiating the neighboring cell.

In some embodiments, a terminal device is provided, including a memory, a processor, and an executable program stored in the memory and capable of being run by the processor. When the executable program is executed, the processor is caused to perform: measuring at least one neighboring cell, in response to a signal-to-interference-plus-noise ratio (SINR) of a serving cell being less than a first threshold value; and determining a target cell based on a result of measuring the at least one neighboring cell.

Alternatively, when the executable program is executed, the processor is caused to perform: adding the serving cell to a blacklist, and setting a reference signal received power (RSRP) value of the serving cell as a first value during running of a first timer corresponding to the serving cell.

Alternatively, the determining a target cell based on a result of measuring the at least one neighboring cell, includes: filtering the at least one neighboring cell based on S criterion, and obtaining a first cell list.

Alternatively, when the executable program is executed, the processor is caused to perform: removing a first cell from the first cell list in response to the first cell in the first cell list being on the blacklist.

Alternatively, the determining a target cell based on a result of measuring the at least one neighboring cell, includes: sequencing cells in the first cell list based on R criterion, and determining a top ranked cell as the target cell.

Alternatively, the adding the serving cell to a blacklist, includes: adding the serving cell to the blacklist and starting the first timer; and removing the serving cell from the blacklist after the running of the first timer.

Alternatively, the first value is greater than or equal to −200 dBs.

Alternatively, at least one of the conditions where the RSRP of the serving cell is greater than a second threshold value and the RSRQ of the serving cell is greater than a third threshold value is met.

Alternatively, the second threshold value is a threshold value corresponding to the RSRP in a condition of initiating the neighboring cell; and the third threshold value is a threshold value corresponding to the RSRQ in a condition of initiating the neighboring cell.

In some embodiments, a non-transitory computer readable storage medium storing an executable program is provided. When the executable program is executed by a processor, the processor is caused to perform: measuring at least one neighboring cell, in response to a signal-to-interference-plus-noise ratio (SINR) of a serving cell being less than a first threshold value; and determining a target cell based on a result of measuring the at least one neighboring cell.

Alternatively, when the executable program is executed by the processor, the processor is caused to perform: adding the serving cell to a blacklist, and setting a reference signal received power (RSRP) value of the serving cell as a first value during running of a first timer corresponding to the serving cell. The blacklist is a list of neighboring cells with a SINR less than the first threshold value.

Figure 2:
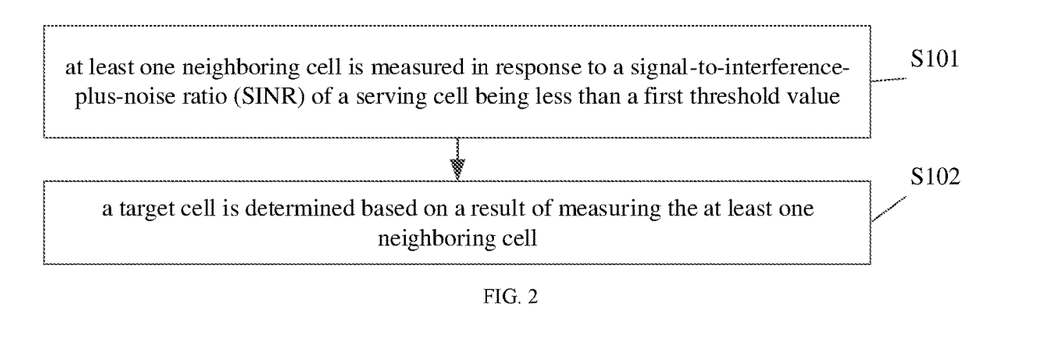
FIG. 2 is an alternative flowchart of a method for determining a target cell provided by some embodiments of the present disclosure.

FIG. 2 is an alternative flowchart of a method for determining a target cell provided by some embodiments of the present disclosure, which will be explained according to the following operations illustrated at each block.

At block S101, at least one neighboring cell is measured in response to a signal-to-interference-plus-noise ratio (SINR) of a serving cell being less than a first threshold value.

In some embodiments, a terminal device measures the at least one neighboring cell in response to the SINR of the serving cell being less than the first threshold value.

In specific implementation, when a cell selection receiving power value of the serving cell and a cell selection quality value of the serving cell are both greater than threshold values for initiating neighboring cell measurement carried in cell broadcast, and the SINR of the serving cell is less than the first threshold value, the terminal device measures the at least one neighboring cell. Alternatively, when at least one of the cell selection receiving power value and the cell selection quality value of the serving cell is less than the threshold value for initiating the neighboring cell measurement carried in the cell broadcast, and the SINR of the service is less than the first threshold value, the terminal device measures the at least one neighboring cell. That is, regardless of whether the cell selection receiving power value of the serving cell and the cell selection quality value of the serving cell are greater than the threshold values for initiating the neighboring cell measurement, the terminal device can initiate the neighboring cell measurement and measure at least one neighboring cell in response to the SINR of the serving cell being less than the first threshold value.

In some embodiments, when the terminal device does not perform the neighboring cell measurement based on the RSRP or the RSRQ, the terminal device measures the at least one neighboring cell in response to the SINR of the serving cell being less than the first threshold value.

In specific implementation, after the RSRP or the RSRQ of the serving cell measured by the terminal device is processed according to the S criterion, the terminal device will initiate the neighboring cell measurement in response to the at least one of the cell selection receiving power value of the serving cell and the cell selection quality value of the serving cell being less than or equal to the threshold value for initiating the neighboring cell measurement carried in the cell broadcast. It is indicated that the RSRP and the RSRQ of the serving cell are both greater than the threshold values for initiating the neighboring cell measurement in response to the terminal device not performing the neighboring cell measurement based on the RSRP or the RSRQ.

At block S102, a target cell is determined based on a result of measuring the at least one neighboring cell.

In some embodiments, the terminal device determines the target cell based on the result of measuring the at least one neighboring cell.

In specific implementation, the terminal device obtains the result of measuring the at least one neighboring cell, filters the at least one neighboring cell based on the S criterion, then obtains a first cell list; sequences cells in the first cell list based on the R criterion, and determines a top ranked cell as the target cell.

Thus, through the method for determining the target cell provided by the embodiments of the present disclosure, the terminal device measures the at least one neighboring cell in response to the signal-to-interference-plus-noise ratio (SINR) of the serving cell being less than the first threshold value; determines the target cell based on the result of measuring the at least one neighboring cell, and can trigger the cell reselection when the noise and interference in the serving cell are severe, thereby avoiding the problem of the network being unable to be used due to the terminal device staying in the original serving cell for a long time, and improving the performance of terminal device in transmitting and receiving data.

Figure 3:
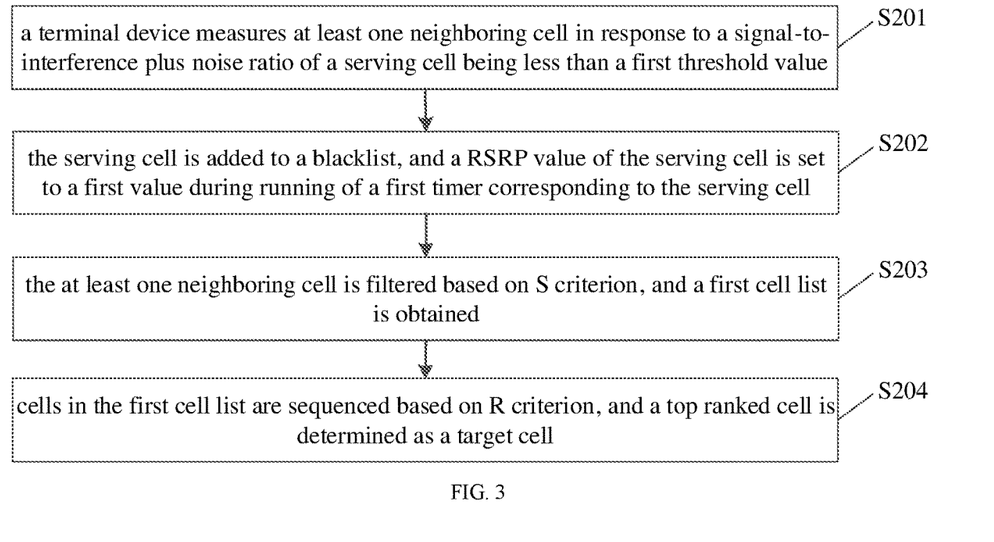
FIG. 3 is another alternative flowchart of a method for determining a target cell provided by some embodiments of the present disclosure.

FIG. 3 is another alternative flowchart of a method for determining a target cell provided by some embodiments of the present disclosure, which will be explained according to the following operations illustrated at each block.

At block S201, a terminal device measures at least one neighboring cell in response to a signal-to-interference-plus-noise ratio of a serving cell being less than a first threshold value.

In some embodiments, when the terminal device not performing neighboring cell measurement based on a RSRP or a RSRQ, the terminal device measures the at least one neighboring cell in response to the SINR of the serving cell being less than the first threshold value. At least one of the conditions wherein the RSRP of the serving cell is greater than a second threshold value, and the RSRQ of the serving cell is greater than a third threshold value is met, that is, only the RSRP of the serving cell is greater than the second threshold value, or only the RSRQ of the serving cell is greater than the third threshold value, or both the RSRP of the serving cell is greater than the second threshold value and the RSRQ of the serving cell is greater than the third threshold value. The second threshold value is a threshold value corresponding to a RSRP in a condition of initiating the neighboring cell. The third threshold value is a threshold value corresponding to a RSRQ in a condition of initiating the neighboring cell.

In specific implementation, the terminal device measures the at least one neighboring cell in response to the cell selection receiving power value of the serving cell and the cell selection quality value of the serving cell being both greater than the threshold values for initiating neighboring cell measurement carried in the cell broadcast and the SINR of the serving cell being less than the first threshold value.

In some other embodiments, the terminal device measures the at least one neighboring cell in response to meeting at least one of the conditions where the RSRP of the serving cell being less than or equal to the second threshold value and the RSRQ of the serving cell being less than or equal to the third threshold value, and in response to the SINR of the serving cell being less than the first threshold value.

At block S202, the serving cell is added to a blacklist, and a RSRP value of the serving cell is set to a first value during running of a first timer corresponding to the serving cell.

In some embodiments, the serving cell is added to the blacklist and the first timer is started in response to the terminal device determining that the SINR of the serving cell is less than the first threshold value. Correspondingly, the first timer starts running. The RSRP value of the serving cell is set to the first value during the running of the first timer corresponding to the serving cell. Alternatively, the first value may be −200 dBs, and in related arts, the measured RSRP value of the cell is greater than −200 dBs, thus ensuring that in the subsequent processes of filtering through the S criterion or sequencing through the R criterion, the serving cell is ranked last in the filtering or sequencing results, that is, the serving cell is not considered during the running of the first timer.

The blacklist is a list of neighboring cells with SINR values less than the first threshold value. After a cell with the SINR less than the first threshold value is added to the blacklist, a corresponding first timer is started, and the cell with the SINR less than the first threshold value is removed from the blacklist after the running of the first timer. Each cell corresponds to a first timer different from others, and running time of first timers corresponding to different cells is the same. The running time of the first timers corresponding to different cells is the same as time when the corresponding cells are added to the blacklist. That is, when any one of the cells is added to the blacklist, the first timer corresponding to the any one of the cells is started, and the any one of the cells is removed from the blacklist after the running of the first timer.

At block S203, the at least one neighboring cell is filtered based on S criterion, and a first cell list is obtained.

In some embodiments, the terminal device filters the at least one neighboring cell based on the S criterion and obtains the first cell list.

In specific implementation, after obtaining the result of measuring the at least one neighboring cell, the terminal device obtains the cell selection receiving power value and the cell selection quality value of the at least one neighboring cell based on the S criterion. Any one of the at least one neighboring cell is added to the first cell list in response to the cell selection receiving power value and cell selection quality value corresponding to any one of the at least one neighboring cell being both greater than 0.

In some embodiments, the method further includes: removing a first cell from the first cell list in response to the first cell in the first cell list being on the blacklist, that is, removing the first cell from the first cell list in response to the SINR of the first cell being less than the first threshold value. The running time of the first timer may be set according to actual needs.

In this way, it may be ensured that the cell selection receiving power values, the cell selection quality values, and the SINRs corresponding to the cells in the first cell list are greater than the corresponding threshold values, respectively, and data services may be provided for the terminal device.

At block S204, cells in the first cell list are sequenced based on R criterion, and a top ranked cell is determined as a target cell.

In some embodiments, the terminal device sequences the cells in the first cell list based on the R criterion, which specifically includes the followings.

The terminal device determines a R parameter (Rn) of at least one of the cells included in the first cell list based on measurement information of the at least one of the cells included in the first cell list, and sequences the at least one of the cells included in the first cell list based on the R parameter of the at least one of the cells, where, specifically, the larger the value of the R parameter of the cell, the higher the position of the cell, and determines the top ranked cell as the target cell.

In some alternative embodiments, the terminal device can switch to the target cell after determining the target cell.

In this way, through the method for determining the target cell provided by embodiments of the present disclosure, the terminal device measures the at least one neighboring cell in response to the signal-to-interference-plus-noise ratio (SINR) of the serving cell being less than the first threshold value; determines the target cell based on the result of measuring the at least one neighboring cell. For the scenario where the serving cell in the LTE network has a good RSRP but a poor SINR, conditions for triggering neighboring cell measurement have been added. For this scenario, the serving cell has been added to the blacklist and the cell reselection solution has been optimized, to some extent avoiding the problem of terminal being unable to access the internet due to the severe noise and interference in the serving cell.

Figure 4:
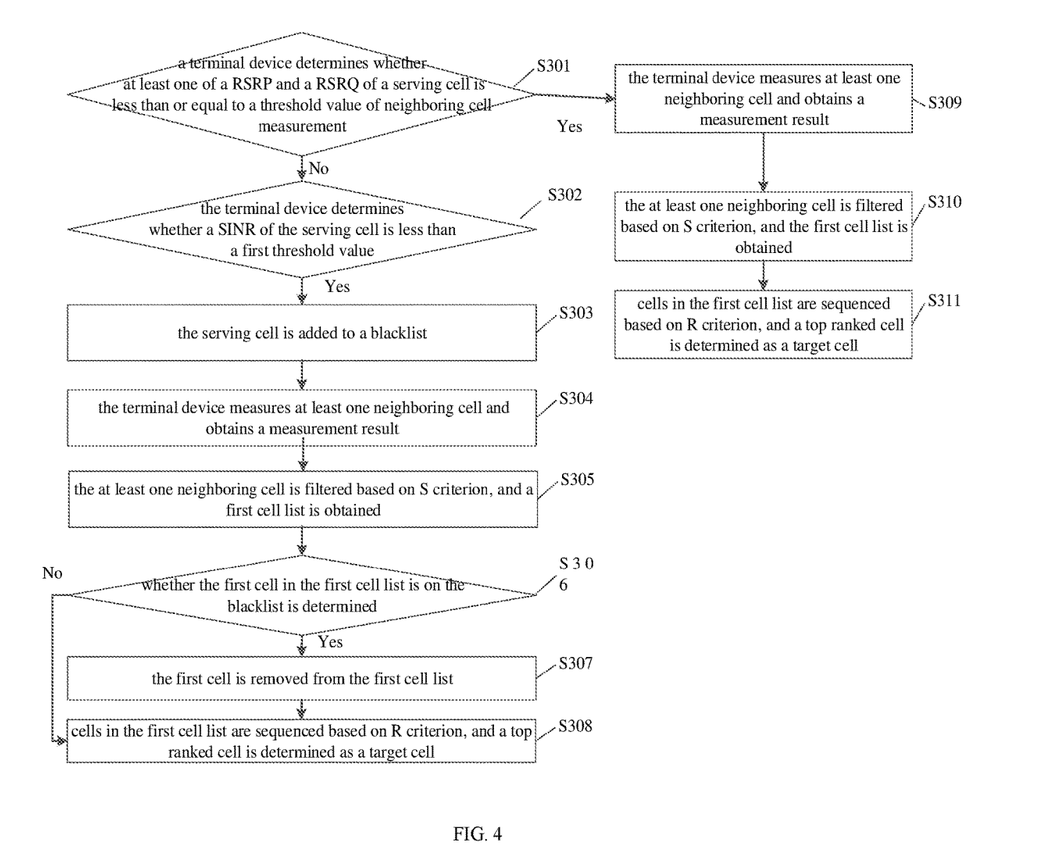
FIG. 4 is another alternative flowchart of a method for determining a target cell provided by some embodiments of the present disclosure.

FIG. 4 is another alternative flowchart of a method for determining a target cell provided by some embodiments of the present disclosure, which will be explained according to the following operations illustrated at each block.

At block S301, a terminal device determines whether at least one of a RSRP and a RSRQ of a serving cell is less than or equal to a threshold value of neighboring cell measurement.

In some embodiments, while the terminal device resides in the serving cell, it is determined whether at least one of the conditions where the RSRP of the serving cell is less than or equal to the threshold value of the neighboring cell measurement and the RSRQ of the serving cell is less than or equal to the threshold value of the neighboring cell measurement is met. Operations at block S309 are performed in response to the at least one of the RSRP and the RSRQ of the serving cell being less than or equal to the threshold value of neighboring cell measurement. Alternatively, operations at block S302 are performed in response to the RSRP and the RSRQ of the serving cell being both greater than the threshold values of neighboring cell measurement.

At block S302, the terminal device determines whether a SINR of the serving cell is less than a first threshold value.

In some embodiments, the terminal device determines whether the SINR of the serving cell is less than the first threshold value. Operations at block S303 are performed in response to the SINR of the serving cell being less than the first threshold value. Alternatively, the terminal device continues to reside in the serving cell in response to the SINR of the serving cell being greater than or equal to the first threshold value.

At block S303, the serving cell is added to a blacklist.

In some embodiments, the serving cell is added to the blacklist and a first timer is started in response to the terminal device determining that the SINR of the serving cell is less than the first threshold value. Correspondingly, the first timer starts running after being started. The RSRP value of the serving cell is set to the first value during the running of the first timer corresponding to the serving cell. Alternatively, the first value may be −200 dBs, and in related arts, the measured RSRP value of the cell is greater than −200 dBs, thus ensuring that in the subsequent processes of filtering through the S criterion or sequencing through the R criterion, the serving cell is ranked last in the filtering or sequencing results, that is, the serving cell is not considered during the running of the first timer. Since the cell reselection based on measurement is triggered by the terminal device reporting an A3 event, the serving cell can also be directly removed during the subsequent sequencing process through the R criterion, and only the measurement result of neighboring cells after sequencing through the R are reported, however, it is uncertain whether network compatibility issues will be introduced. Therefore, the RSRP of the serving cell is forcibly set to the first value to ensure that the RSRP of the neighboring cell is always higher than the RSRP of the serving cell, thereby ensuring that the terminal will switch to other cells in the future without introducing other issues. The A3 event includes: the RSRP of the neighboring cell is better than the RSRP of the serving cell, and thus the terminal device can determine whether to switch to the neighboring cell based on whether the A3 event occurs.

The blacklist is a list of neighboring cells with the SINR values less than the first threshold value. After a cell with the SINR less than the first threshold value is added to the blacklist, a corresponding first timer is started, and the cell with the SINR less than the first threshold value is removed from the blacklist after the running of the first timer. Each cell corresponds to a first timer different from others, and running time of first timers corresponding to different cells is the same. The running time of the first timers corresponding to different cells is the same as time when the corresponding cells are added to the blacklist. That is, when any one of the cells is added to the blacklist, the first timer corresponding to the any one of the cells is started, and the any one of the cells is removed from the blacklist after the running of the first timer. The running time of the first timer may be set according to actual needs.

In this way, in the subsequent process of target cell determining, cells that have been added to the blacklist can still be considered.

At block S304, the terminal device measures at least one neighboring cell and obtains a measurement result.

In some embodiments, the terminal device measures the at least one neighboring cell and obtains the at least one measurement result.

At block S305, the at least one neighboring cell is filtered based on S criterion, and a first cell list is obtained.

In some embodiments, the terminal device filters the at least one neighboring cell based on the S criterion, and obtains the first cell list.

In specific implementation, after obtaining the result of measuring the at least one neighboring cell, the terminal device obtains a cell selection receiving power value and a cell selection quality value of the at least one neighboring cell based on the S criterion, and adds any one of the at least one neighboring cell to the first cell list in response to the cell selection receiving power value and cell selection quality value corresponding to the any one of the at least one neighboring cell being both greater than 0.

In some embodiments, the method further includes: removing a first cell from the first cell list in response to the first cell in the first cell list being in the blacklist, that is, removing the first cell from the first cell list in response to the SINR of the first cell being less than the first threshold value.

In this way, it may be ensured that the cell selection receiving power value, the cell selection quality value, and the SINR corresponding to the cells in the first cell list are greater than the corresponding threshold values respectively, and data services may be provided for the terminal device.

At block S306, whether the first cell in the first cell list is on the blacklist is determined.

In some embodiments, the terminal device determines whether the first cell in the first cell list is on the blacklist. Operations at block S307 are performed in response to the first cell in the first cell list being on the blacklist. Operations at block S308 are performed in response to the first cell in the first cell list is not on the blacklist.

Specifically, part of the cells in the first cell list obtained after the processes of neighboring cell measurement and filtering through the S criterion are on the blacklist, that is, the part of the cells were previously added to the blacklist due to the poor SINRs, and the corresponding first timers are still running, and the part of the cells will not be considered during the sequencing through the R criterion in the future.

At block S307, the first cell is removed from the first cell list.

In some embodiments, the terminal device removes the first cell from the first cell list in response to the first cell in the first cell list being on the blacklist, that is, the first cell is removed from the first cell list in response to the SINR of the first cell being less than the first threshold value, and the first cell is not considered in subsequent sequencing.

In some embodiments, the method also includes operations at block S308 after the terminal device removes the first cell from the first cell list.

At block S308, cells in the first cell list are sequenced based on R criterion, and a top ranked cell is determined as a target cell.

In some embodiments, the terminal device sequences the cells in the first cell list based on the R criterion, specifically including the followings.

The terminal device determines a R parameter (Rn) of at least one of the cells included in the first cell list based on measurement information of the at least one of the cells included in the first cell list, and sequences the at least one of the cells included in the first cell list based on the R parameter of at least one of the cells, where, specifically, the larger the value of the R parameter of the cell, the higher the position of the cell, and determines the top ranked cell as the target cell.

In some alternative embodiments, the terminal device can switch to the target cell after determining the target cell.

At block S309, the terminal device measures at least one neighboring cell and obtains a measurement result.

In some embodiments, the terminal device measures the at least one neighboring cell and obtains the at least one the measurement result.

At block S310, the at least one neighboring cell is filtered based on S criterion, and the first cell list is obtained.

In some embodiments, the terminal device filters the at least one neighboring cell based on the S criterion, and obtains the first cell list.

In specific implementation, after obtaining the result of measuring the at least one neighboring cell, the terminal device obtains the cell selection receiving power value and the cell selection quality value of the at least one neighboring cell based on the S criterion. Any one of the at least one neighboring cell is added to the first cell list in response to the cell selection receiving power value and cell selection quality value corresponding to any one of the at least one neighboring cell being both greater than 0.

In some embodiments, the method further includes: removing the first cell from the first cell list in response to the first cell in the first cell list being on the blacklist, that is, removing the first cell from the first cell list in response to the SINR of the first cell being less than the first threshold value.

In this way, it may be ensured that the cell selection receiving power value, the cell selection quality value, and the SINR corresponding to the cells in the first cell list are greater than the corresponding threshold values respectively, and data services may be provided for the terminal device.

At block S311, cells in the first cell list are sequenced based on R criterion, and a top ranked cell is determined as a target cell.

In some embodiments, the terminal device sequences the cells in the first cell list based on the R criterion, which specifically includes the followings.

The terminal device determines a R parameter (Rn) of at least one of the cells included in the first cell list based on measurement information of the at least one of the cells included in the first cell list, and sequences the at least one of the cells included in the first cell list based on the R parameter of at least one of the cells, where, specifically, the larger the value of the R parameter of the cell, the higher the position of the cell, and determines the top ranked cell as the target cell.

In some alternative embodiments, the terminal device can switch to the target cell after determining the target cell.

In this way, through the method for determining the target cell provided by embodiments of the present disclosure, for the scenario where the serving cell in the LTE network has a good RSRP but a poor SINR, the conditions for triggering neighboring cell measurement are added, that is, when the signal strength of the serving cell is good but the noise and interference is severe, the cell reselection is triggered, thereby avoiding the problem of the network being unable to be used due to the terminal device staying in the original serving cell for a long time, and improving the performance of terminal device in transmitting and receiving data.

Figure 5:
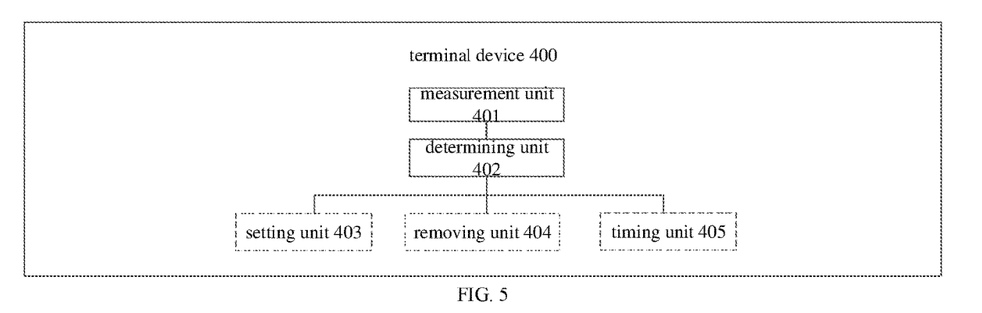
FIG. 5 is an alternative structural schematic view of a terminal device provided by some embodiments of the present disclosure.

FIG. 5 is an alternative structural schematic view of a terminal device provided by some embodiments of the present disclosure. Each component will be explained.

In some embodiments, a terminal device 400 includes a measurement unit 401 and a determining unit 402.

When neighboring cell measurement is not performed base on a reference-signal receiving-power (RSRP) or a reference-signal receiving-quality (RSRQ), the measurement unit 401 is configured to measure at least one neighboring cell in response to a SINR of a serving cell being less than a first threshold value.

The determining unit 402 is configured to determine a target cell based on a result of measuring the at least one neighboring cell.

In some embodiments, the terminal device 400 further includes a setting unit 403.

The setting unit 403 is configured to add the serving cell to a blacklist in response to the SINR of the serving cell being less than the first threshold value, and set the RSRP value of the serving cell to a first value during running of a first timer corresponding to the serving cell.

The blacklist is a list of neighboring cells with SINRs less than the first threshold value.

The determining unit 402 is further configured to filter the at least one neighboring cell based on S criterion, and is configured to obtain a first cell list.

In some embodiments, the terminal device 400 further includes a removing unit 404.

The removing unit 404 is configured to remove a first cell from the first cell list in response to the first cell in the first cell list being on the blacklist.

The determining unit 402 is further configured to sequence cells in the first cell list based on R criterion, and is configured to determine a top ranked cell as a target cell.

In some embodiments, the terminal device 400 further includes a timing unit 405.

The timing unit 405 is configured to start the first timer after the cell with the SINR less than the first threshold value is added to the blacklist, and is configured to remove the cell with the SINR less than the first threshold value after the running of the first timer.

Figure 6:
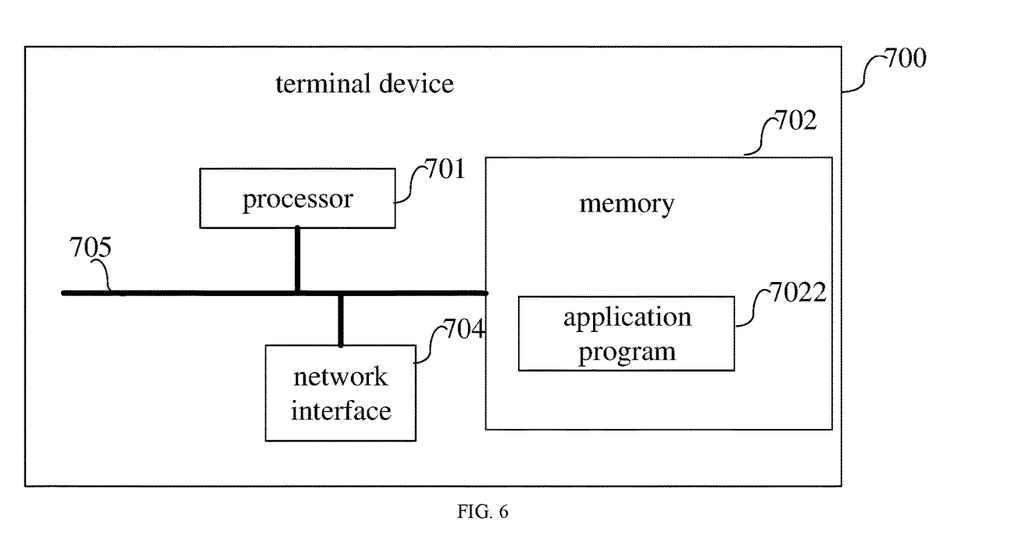
FIG. 6 is a structural schematic view of hardware components of a terminal device provided by some embodiments of the present disclosure.

FIG. 6 is a structural schematic view of hardware components of a terminal device provided by some embodiments of the present disclosure. The terminal device includes at least one processor 701, a memory 702, and at least one network interface 704. Various components in the terminal device are coupled together through a bus system 705. It can be understood that the bus system 705 is configured to achieve connection communication between these components. The bus system 705 includes not only a data bus, but also a power bus, a control bus, and a status signal bus. Various buses are labeled as bus system 705 in FIG. 6 for clarity.

It can be understood that the memory 702 may be a volatile memory or a non-volatile memory, and can also include both the volatile memory and the non-volatile memory. The non-volatile memory may be a ROM, a programmable read only memory (PROM), an erasable programmable read only memory (EPROM), an electrically erasable programmable read only memory (EEPROM), a ferromagnetic random access memory (FRAM), a flash memory, a magnetic surface memory, an optical disc, or a compact disc read only memory (CD-ROM). The magnetic surface memory may be a magnetic disk memory or a magnetic tape memory. The volatile memory may be a random access memory (RAM), which is used as an external cache. By way of illustrative but not restrictive explanations, many forms of RAM are available, such as a static random access memory (SRAM), a synchronous static random access memory (SSRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a syncLink dynamic random access memory (SLDRAM), or a direct rambus random access memory (DRRAM). The memory 702 described in the embodiments of the present disclosure is intended to include but not limited to the above and any other suitable types of memory.

The memory 702 in embodiments of the present disclosure is configured to store various types of data to support operations of the terminal device. Examples of these data include any computer program which can be performed on the terminal device, such as an application program 7022. The program for implementing the method of embodiments of the present disclosure may be included in an application program 7022.

The method disclosed in the embodiments of the present disclosure may be performed by the processor 701 or be executed by the processor 701. The processor 701 may be an integrated circuit chip with signal processing capabilities. During the execution process, each operation of the method may be completed through hardware integrated logic circuits or software instructions in the processor 701. The processor 701 may be a general-purpose processor, a digital signal processor (DSP), or other programmable logic devices, a discrete gate or a transistor logic device, a discrete hardware component, or the like. The processor 701 can execute or perform the disclosed methods, operations, and logical block diagrams in the embodiments of the present disclosure. The general-purpose processor may be a microprocessor or any conventional processor. The operations of the methods disclosed by the embodiments of the present disclosure may be directly executed or performed by a hardware decoding processor, or executed by combination of hardware and software modules in the decoding processor. The software modules may be located in a storage medium, and the storage medium is located in the memory 702. The processor 701 reads information in the memory 702 and, in conjunction with its hardware, completes the following operations: measuring at least one neighboring cell in response to a signal-to-interference-plus-noise ratio (SINR) of a serving cell being less than a first threshold value; and determining a target cell based on a result of measuring the at least one neighboring cell.

In an alternative embodiment, when running an executable program, the processor performs the following operations: adding the serving cell to a blacklist, and setting a reference signal received power (RSRP) value of the serving cell to a first value during running of a first timer corresponding to the serving cell.

In an alternative embodiment, the determining a target cell based on a result of measuring the at least one neighboring cell includes: filtering the at least one neighboring cell based on S criterion, and obtaining a first cell list.

In an alternative embodiment, when running the executable program, the processor performs the following operations: removing a first cell from the first cell list in response to the first cell in the first cell list being on the blacklist.

In an alternative embodiment, the determining a target cell based on a result of measuring the at least one neighboring cell includes: sequencing cells in the first cell list based on R criterion, and determining a top ranked cell as a target cell.

In an alternative embodiment, the adding the serving cell to a blacklist includes: adding the serving cell to the blacklist and starting the first timer; and removing the serving cell from the blacklist after the running of the first timer.

In an alternative embodiment, at least one of the conditions where the RSRP of the serving cell is greater than a second threshold value and, the RSRQ of the serving cell is greater than a third threshold value is met.

In an exemplary embodiment, the terminal device may be implemented by one or more application specific integrated circuits, DSPs, programmable logic devices (PLDs), complex programmable logic device (CPLDs), FPGAs, general purpose processors, controllers, MCUs, MPUs, or other electronic components for performing the above methods.

Some embodiments of the present disclosure also provide a storage medium configured to store a computer program.

Alternatively, the storage medium may be performed by a first client in some embodiments of the present disclosure, and the computer program causes a computer to perform corresponding processes in the various methods of the embodiments of the present disclosure, which will not be repeated here for simplicity.

The present disclosure is described with reference to the flowchart and/or block diagram of the method, the device (system), and the computer program product according to the embodiments of the present disclosure. It should be understood that each process and/or block in a flowchart and/or block diagram may be implemented by computer program instructions, and a combination of processes and/or blocks in the flowchart and/or block diagram. These computer program instructions may be provided to a processor of a general-purpose computer, a specialized computer, an embedded processor, or other programmable data processing devices to generate a machine, so that instructions executed by the processor of the computer or other programmable data processing devices generate a device for implementing functions specified in a flowchart or multiple flows and/or a block or multiple blocks in a block diagram.

These computer program instructions can also be stored in a computer-readable memory that can guide a computer or other programmable data processing device to work in a specific way, such that the instructions stored in the computer-readable memory generate a manufacture including an instruction device that realizes the functions specified in one or more processes of flow charts and/or one or more blocks of the block diagrams.

These computer program instructions can also be loaded onto a computer or other programmable data processing device, such that a series of operations can be performed on the computer or other programmable device to generate a computer implemented process. Thus, the instructions executed on a computer or other programmable device provide steps for implementing the functions specified in one or more processes of flow charts and/or one or more blocks of the block diagrams.

The above description is only preferred embodiments of the present disclosure and is not intended to limit the scope of protection of the present disclosure. Any modifications, equivalent replacements, and improvements made within the spirit and principles of the present disclosure should be included in the scope of protection of the present disclosure.

INDUSTRIAL APPLICABILITY

In the method for determining the target cell, the terminal device, and the storage medium provided by embodiments of the present disclosure, the at least one neighboring cell is measured in response to the SINR of the serving cell being less than the first threshold value; and the target cell is determined based on the result of measuring the at least one neighboring cell. In this way, the terminal device can initiate neighboring cell measurement in response to the SINR of the serving cell being less than the first threshold value, and then can switch to the target cell, thereby improving the performance of the terminal device in transmitting and receiving data.

What is claimed is:

1. A method for determining a target cell, performed by a terminal device, comprising:
    measuring at least one neighboring cell, in response to a signal-to-interference-plus-noise ratio (SINR) of a serving cell being less than a first threshold value; and
    determining a target cell based on a result of measuring the at least one neighboring cell;
    the method further comprising:
    adding the serving cell to a blacklist, and setting a reference signal received power (RSRP) value of the serving cell as a first value during running of a first timer corresponding to the serving cell;
    wherein the blacklist is a list of neighboring cells with an SINR less than the first threshold value.

2. The method as claimed in claim 1, wherein the determining a target cell based on a result of measuring the at least one neighboring cell, comprises:
    filtering the at least one neighboring cell based on S criterion, and obtaining a first cell list.

3. The method as claimed in claim 2, further comprising:
    removing a first cell from the first cell list in response to the first cell in the first cell list being on the blacklist.

4. The method as claimed in claim 2, wherein the determining a target cell based on a result of measuring the at least one neighboring cell, comprises:
    sequencing cells in the first cell list based on R criterion, and determining a top ranked cell as the target cell.

5. The method as claimed in claim 1, wherein the adding the serving cell to a blacklist, comprises:
    adding the serving cell to the blacklist and starting the first timer; and
    the method further comprises removing the serving cell from the blacklist after the running of the first timer.

6. The method as claimed in claim 1, wherein the first value is greater than or equal to −200 dBs.

7. The method as claimed in claim 1, wherein at least one of the conditions where an RSRP of the serving cell is greater than a second threshold value and a reference-signal receiving-quality (RSRQ) of the serving cell is greater than a third threshold value is met.

8. The method as claimed in claim 7, wherein the second threshold value is a threshold value corresponding to the RSRP in a condition of initiating the neighboring cell; and the third threshold value is a threshold value corresponding to the RSRQ in a condition of initiating the neighboring cell.

9. A terminal device, comprising a memory, a processor, and an executable program stored in the memory and capable of being run by the processor, wherein when the executable program is executed, the processor is caused to perform:
    measuring at least one neighboring cell, in response to a signal-to-interference-plus-noise ratio (SINR) of a serving cell being less than a first threshold value; and
    determining a target cell based on a result of measuring the at least one neighboring cell;
    wherein when the executable program is executed, the processor is further caused to perform;
    adding the serving cell to a blacklist, and setting a reference signal received power (RSRP) value of the serving cell as a first value during running of a first timer corresponding to the serving cell;
    wherein the blacklist is a list of neighboring cells with an SINR less than the first threshold value.

10. The terminal device as claimed in claim 9, wherein the determining a target cell based on a result of measuring the at least one neighboring cell, comprises:
    filtering the at least one neighboring cell based on S criterion, and obtaining a first cell list.

11. The terminal device as claimed in claim 10, wherein when the executable program is executed, the processor is caused to perform:
    removing a first cell from the first cell list in response to the first cell in the first cell list being on the blacklist.

12. The terminal device as claimed in claim 10, wherein the determining a target cell based on a result of measuring the at least one neighboring cell, comprises:
    sequencing cells in the first cell list based on R criterion, and determining a top ranked cell as the target cell.

13. The terminal device as claimed in claim 9, wherein the adding the serving cell to a blacklist, comprises:
    adding the serving cell to the blacklist and starting the first timer; and
    wherein when the executable program is executed the processor is further caused to perform: removing the serving cell from the blacklist after the running of the first timer.

14. The terminal device as claimed in claim 9, wherein the first value is greater than or equal to −200 dBs.

15. The terminal device as claimed in claim 9, wherein at least one of the conditions where an RSRP of the serving cell is greater than a second threshold value and a reference-signal receiving-quality (RSRQ) of the serving cell is greater than a third threshold value is met.

16. The terminal device as claimed in claim 15, wherein the second threshold value is a threshold value corresponding to the RSRP in a condition of initiating the neighboring cell; and the third threshold value is a threshold value corresponding to the RSRQ in a condition of initiating the neighboring cell.

17. A non-transitory computer readable storage medium storing an executable program, wherein when the executable program is executed by a processor, the processor is caused to perform:
    measuring at least one neighboring cell, in response to a signal-to-interference-plus-noise ratio (SINR) of a serving cell being less than a first threshold value; and
    determining a target cell based on a result of measuring the at least one neighboring cell;
    wherein when the executable program is executed by the processor, the processor is further caused to perform:
    adding the serving cell to a blacklist, and setting a reference signal received power (RSRP) value of the serving cell as a first value during running of a first timer corresponding to the serving cell;

wherein the blacklist is a list of neighboring cells with an SINR less than the first threshold value.

* * * * *